United States Patent
Suzuki (10) Patent No.: US 11,911,827 B2
(45) Date of Patent: Feb. 27, 2024

(54) CUTTING INSERT

(71) Applicant: TUNGALOY CORPORATION, Fukushima (JP)

(72) Inventor: Yusuke Suzuki, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 162 days.

(21) Appl. No.: 17/686,540

(22) Filed: Mar. 4, 2022

(65) Prior Publication Data

US 2022/0410277 A1 Dec. 29, 2022

(30) Foreign Application Priority Data

Jun. 25, 2021 (JP) ................................. 2021-105847

(51) Int. Cl.
*B23B 27/14* (2006.01)

(52) U.S. Cl.
CPC .......... *B23B 27/141* (2013.01); *B23B 27/143* (2013.01); *B23B 2200/087* (2013.01); *B23B 2200/202* (2013.01)

(58) Field of Classification Search
CPC ............ B23B 27/141; B23B 2200/202; B23B 2200/087; B23B 27/143; B23B 27/145; B23B 2200/081; B23B 27/1618; B23B 27/045; B23B 2200/32; B23B 2210/06
See application file for complete search history.

(56) References Cited

U.S. PATENT DOCUMENTS

| | | | | |
|---|---|---|---|---|
| 2,392,001 A | * | 1/1946 | Raper | .................... B23D 13/00 407/116 |
| 5,137,396 A | * | 8/1992 | Durschinger | ......... B23B 27/045 407/116 |
| 6,986,626 B2 | * | 1/2006 | Gati | ...................... B23B 27/045 407/113 |
| 7,883,300 B1 | * | 2/2011 | Simpson, III | ......... B23B 27/045 407/115 |
| 11,052,465 B2 | * | 7/2021 | Jonsson | ................ B23B 27/141 |

(Continued)

FOREIGN PATENT DOCUMENTS

| | | | | |
|---|---|---|---|---|
| CN | 206083331 U | | 4/2017 | |
| DE | 102013011031 A1 | * | 1/2015 | ........... B23B 27/141 |

(Continued)

*Primary Examiner* — Sara Addisu
(74) *Attorney, Agent, or Firm* — Studebaker & Brackett PC (57) ABSTRACT

There is provided a cutting insert having a low possibility that chips roughen a machined surface of a workpiece in back turning. The cutting insert includes a rake surface, a peripheral side surface, a front cutting edge which is provided on a ridge of the rake surface and the peripheral side surface, and a main cutting edge which is provided on the ridge so as to be continuous with the front cutting edge and has an extension direction which forms an obtuse angle with an extension direction of the front cutting edge, the main cutting edge is curved into a U shape over an entire length of an effective edge range which functions as a cutting blade, and the deepest point of the U shape is positioned in a range closer to a side of a corner than a position which divides a straight line connecting both ends of the main cutting edge at a ratio of 2:1 from the side of the corner positioned adjacent to the front cutting edge.

2 Claims, 9 Drawing Sheets

(56) References Cited

U.S. PATENT DOCUMENTS

| | | | |
|---|---|---|---|
| 2002/0122700 A1* | 9/2002 | Inayama | B23B 27/045 407/117 |
| 2007/0183858 A1* | 8/2007 | Blomstedt | B23B 27/145 407/113 |
| 2013/0149057 A1* | 6/2013 | Nisikawa | B23B 51/0054 408/83 |
| 2017/0066060 A1* | 3/2017 | Tsuda | B23B 27/141 |
| 2017/0266732 A1* | 9/2017 | Andoh | B23B 27/143 |
| 2019/0061016 A1* | 2/2019 | Sagara | B23B 27/045 |
| 2019/0176241 A1* | 6/2019 | Hirukawa | B23B 27/1614 |
| 2022/0134444 A1* | 5/2022 | Schmidt | B23B 27/08 407/30 |
| 2022/0258252 A1* | 8/2022 | Suzuki | B23B 27/08 |
| 2022/0274184 A1* | 9/2022 | Suzuki | B23B 27/16 |

FOREIGN PATENT DOCUMENTS

| | | | |
|---|---|---|---|
| EP | 0245225 A2 | | 11/1987 |
| GB | 350706 A | | 6/1931 |
| JP | 2010-099815 A | | 5/2010 |
| JP | 2016-055360 A | | 4/2016 |
| JP | 2017-193001 A | | 10/2017 |
| JP | 2017193001 A | * | 10/2017 |
| JP | 2019-104088 A | | 6/2019 |
| JP | 2021007991 A | * | 1/2021 |

\* cited by examiner

GROOVE MACHINING

FIG. 2B

OUTER DIAMETER MACHINING

VIEW SEEN FROM DIRECTION OF ARROW B

CROSS-SECTIONAL VIEW TAKEN ALONG LINE C-C

FIG. 9

VIEW SEEN FROM DIRECTION OF ARROW D

CUTTING INSERT

BACKGROUND

Field

The present invention relates to a cutting insert.

Description of Related Art

One of requests to improve a cutting insert for back turning used in an automatic lathe relates to chip control (see, e.g., Patent Publication JP-A-2019-104088).

SUMMARY

Back turning has a characteristic in which chips tend to be lengthened, and there are cases where the lengthened chips come into contact with a machined surface of a workpiece to roughen the machined surface. In particular, in the case of the back turning, a groove end surface formed during groove machining and an outer diameter surface formed during outer diameter machining serve as machined surfaces, and hence management of chips at a particularly high level is required.

The present invention has been made in order to solve such a problem, and provides a cutting insert having a low possibility that chips roughen a machined surface of a workpiece in back turning.

A cutting insert in an aspect of the present invention includes a rake surface, a peripheral side surface, a front cutting edge which is provided on a ridge of the rake surface and the peripheral side surface, and a main cutting edge which is provided on the ridge so as to be continuous with the front cutting edge, and has an extension direction which forms an obtuse angle with an extension direction of the front cutting edge, the main cutting edge is curved into a U shape over an entire length of an effective edge range which functions as a cutting blade, and a deepest point of the U shape is positioned in a range closer to a side of a corner than a position which divides a straight line connecting both ends of the main cutting edge at a ratio of 2:1 from the side of the corner positioned adjacent to the front cutting edge. According to the thus configured cutting insert, during outer diameter machining in which chips tend to be lengthened relatively and a depth of cut is large, a decentered inflection portion is caused to occur in a cross section of the chips, and its stiffness acts so as to prevent torsion of the chips. With this, it becomes easy for a force which the chips receive when the chips collide with a breaker wall surface to act as a force for bending the chips instead of facilitating the torsion of the chips. By such a bending force, the generated chips are broken finely. The chips which are finely broken are less likely to roughen the machined surface than lengthened spiral chips.

According to the present invention, it is possible to provide the cutting insert having a low possibility that the chips roughen the machined surface of the workpiece in back turning.

DETAILED DESCRIPTION

An embodiment of the present invention will be described with reference to the accompanying drawings. In the individual drawings, components provided with the same reference numerals have the same or similar configurations. In addition, in the individual drawings, in the case where a plurality of structures having the same or similar configurations are present, there are cases where part of the structures are provided with reference numerals and providing the other structures with the same reference numerals is omitted in order to avoid complication. Further, all configurations described in the embodiment are not necessarily essential as means for solving the problem.

Figure 1:
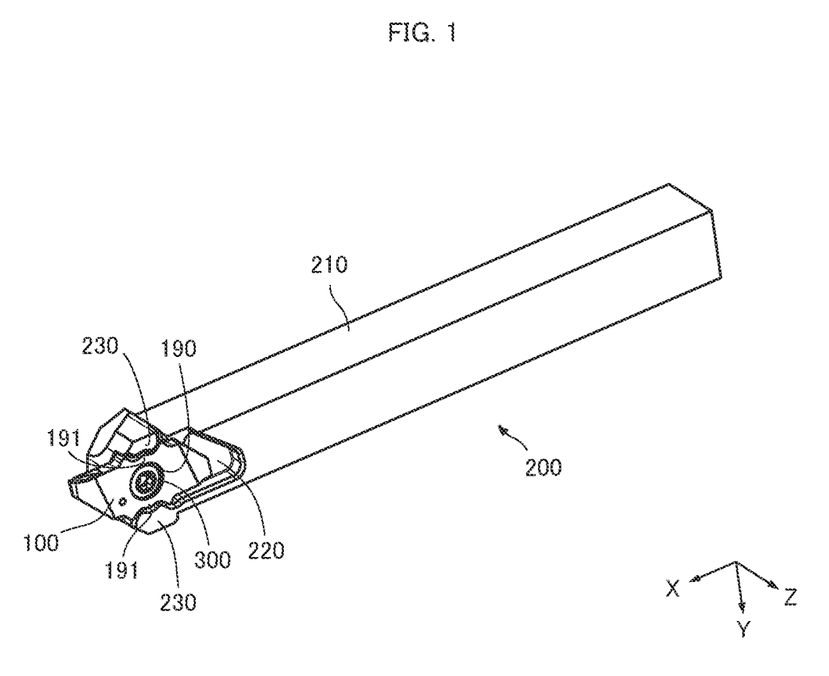
FIG. 1 is an overall perspective view of a cutting tool to which a cutting insert according to the present embodiment is mounted.

FIG. 1 is an overall perspective view of a cutting tool 200 to which a cutting insert 100 according to the present embodiment is mounted. The cutting tool 200 in the present embodiment is a cutting tool for a lathe, and is used especially in back turning. A main body portion 210 has a mounting seat 220 to which the cutting insert 100 is mounted, and two holding portions 230 which hold the cutting insert 100 between the holding portions 230.

The mounting seat 220 is a mounting surface for the cutting insert 100 which is provided in the vicinity of a tip of the main body portion 210. A female screw hole is provided in the mounting seat 220 and, when the cutting insert 100 is mounted, the female screw hole is coaxial with a mounting hole 190 provided substantially at the center of the cutting insert 100. The cutting insert 100 is fixed to the mounting seat 220 by a mounting screw 300 which is screwed into the female screw hole via the mounting hole 190.

The two holding portions 230 have shapes which swell from the mounting seat 220 and protrude in a direction in which the holding portions 230 face each other. When the cutting insert 100 is placed on the mounting seat 220, two concave portions 191 provided so as to face a middle portion of the cutting insert 100 are fitted on the holding portions 230, and prevent rotational runout of the cutting insert 100.

Note that an X axis, a Y axis, and a Z axis are determined in a manner shown in the drawing. That is, a direction in which the holding portions 230 hold the cutting insert 100 between the holding portions 230 is a Y axis direction, a direction of the mounting hole 190 when the cutting insert 100 is mounted to the mounting seat 220 is a Z axis direction, and a direction orthogonal to the Y axis direction and the Z axis direction is an X axis direction. In the drawings shown below, by writing similar coordinate axes having, as a reference, a state in which the cutting insert 100 is mounted as shown in FIG. 1, the directions of structures represented in the individual drawings are shown.

Figure 2A:
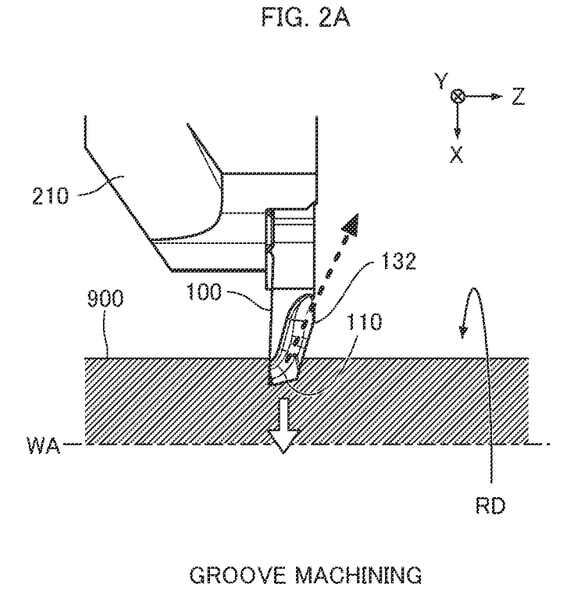
FIG. 2A is a view for explaining machining processes of cutting.
Figure 2B:
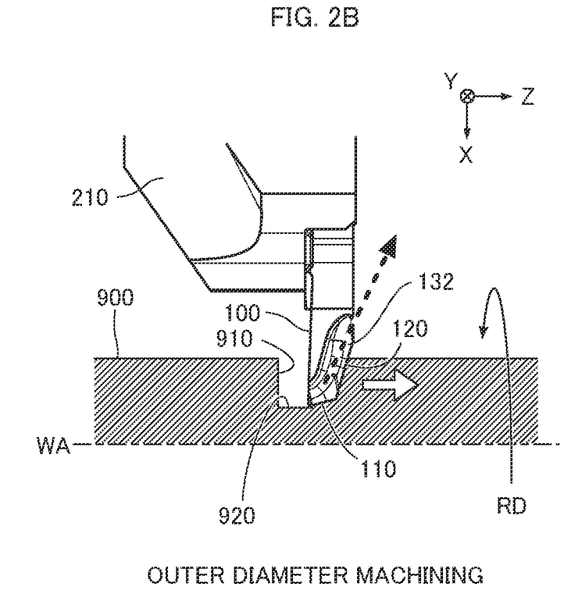
FIG. 2B is a view for explaining machining processes of the cutting.

FIGS. 2A and 2B are views for explaining machining processes of cutting. Specifically, FIG. 2A shows a state of groove machining, and FIG. 2B shows a state of outer diameter machining (back turning). In each machining, a workpiece 900 is fixed to a chuck of a lathe, and is rotated in a direction of an arrow RD about a rotation axis WA.

In the groove machining shown in FIG. 2A, as indicated by an open arrow, the cutting insert 100 fixed to the main body portion 210 is fed toward the rotation axis WA of the workpiece 900, and a front cutting edge 110 which acts mainly in the feed direction cuts the workpiece 900 to form a groove. Chips generated by cutting by the front cutting edge 110 are guided by a breaker groove surface 132 and discharged to the outside toward a direction of a dotted arrow.

When a target depth is reached and the groove machining is ended, outer diameter machining is continuously performed. In the outer diameter machining shown in FIG. 2B, as indicated by an open arrow, the cutting insert 100 is fed along the direction of the rotation axis WA of the workpiece 900, and a main cutting edge 120 which acts mainly in the feed direction cuts the workpiece 900 to extend the groove in a direction of back turning. Chips generated by cutting by the main cutting edge 120 are guided by the breaker groove surface 132 and discharged to the outside toward a direction of a dotted arrow.

By such machining processes, a groove end surface 910 and an outer diameter surface 920 are formed in the workpiece 900. Note that a cutting edge which finishes the outer diameter surface 920 is the front cutting edge 110 also in the outer diameter machining. The groove end surface 910 and the outer diameter surface 920 formed in this manner are machined surfaces by the cutting insert 100. In the cutting insert 100 according to the present embodiment, the shapes of the front cutting edge 110 and the main cutting edge 120 are devised such that generated chips are prevented from coming into contact with the machined surfaces to roughen the machined surfaces. Hereinbelow, a description will be made sequentially.

Figure 3:
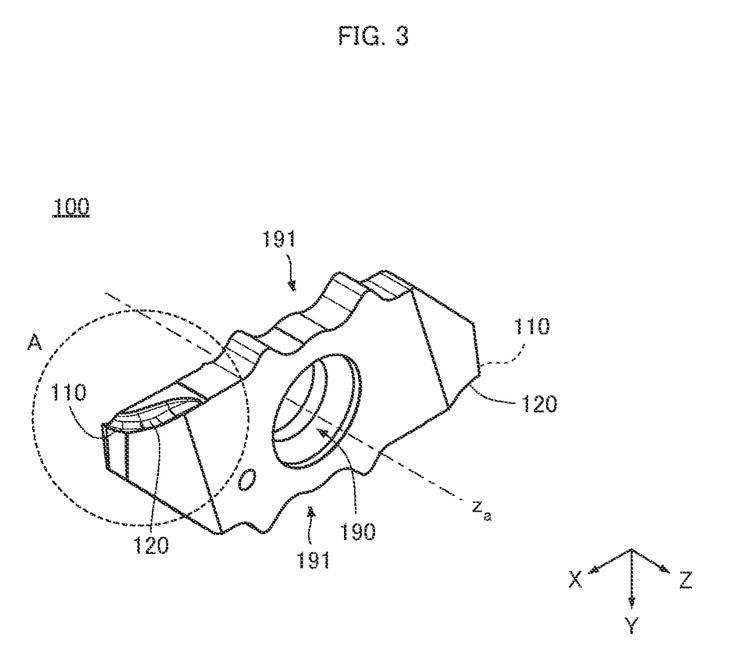
FIG. 3 is an overall perspective view of the cutting insert.

FIG. 3 is an overall perspective view of the cutting insert 100. The cutting insert 100 has, as an overall shape, a substantially plate-shaped parallelogram, and the mounting hole 190 into which the mounting screw 300 is to be inserted is provided at the center of the cutting insert 100. In a vertical direction (Y axis direction) of the mounting hole 190, as described above, the concave portions 191 in which the holding portions 230 of the mounting seat 220 are fitted are provided.

The front cutting edge 110 and the main cutting edge 120 are provided at end portions of upper and lower sides which intersect the hypotenuse in the overall shape which is substantially the parallelogram so as to form an acute angle. That is, two combinations of the front cutting edges 110 and the main cutting edges 120 are provided for one cutting insert 100. In the case where the cutting edges of one combination reach the limit of use, it is possible to use the cutting edges of the other combination by rotating the cutting insert 100 by 180° about a central axis $z_a$ of the mounting hole 190 and mounting the cutting insert 100 again.

Figure 4A:
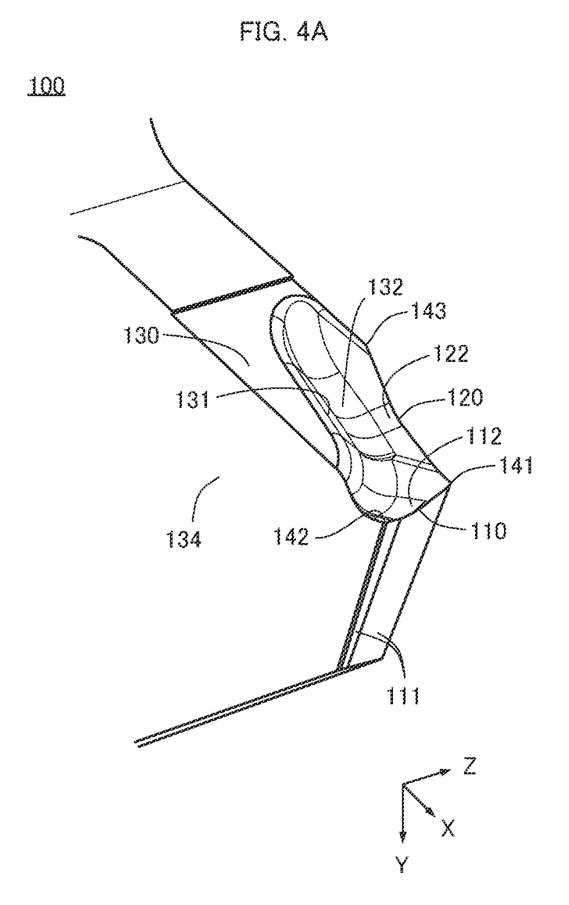
FIG. 4A is a partially enlarged view of an edge portion of the cutting insert.
Figure 4B:
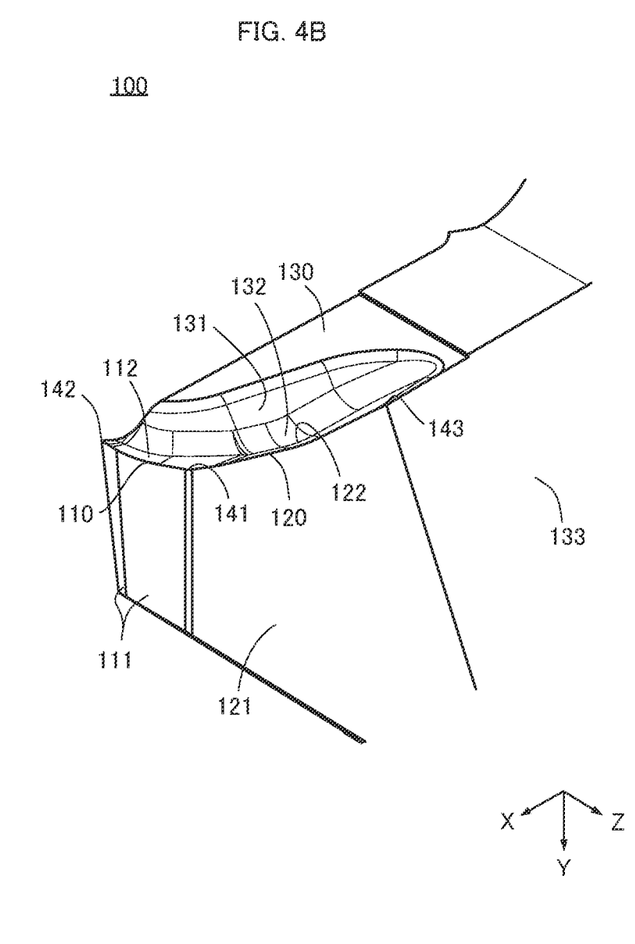
FIG. 4B is a partially enlarged view of the edge portion of the cutting insert.

FIGS. 4A and 4B are partially enlarged views of an edge portion of the cutting insert 100. Specifically, FIGS. 4A and 4B are enlarged views of an A portion in FIG. 3, FIG. 4A is a perspective view when the A portion is observed from the side of the mounting surface in the case where the cutting insert 100 is mounted to the mounting seat 220, and FIG. 4B is a perspective view when the A portion is observed from the side of a surface opposite to the side of the mounting surface.

As a whole, the front cutting edge 110 and the main cutting edge 120 are surrounded by an upper surface 130 parallel to an XZ plane, and four peripheral side surfaces which intersect the upper surface 130 at an angle close to 90 degrees. The four peripheral side surfaces include a first side surface 133 which constitutes a surface opposite to the mounting surface which comes into contact with the mounting seat 220, a main cutting edge flank 121 which is continuous with the first side surface 133 and functions as a flank for the main cutting edge 120, a front cutting edge flank 111 which is continuous with the main cutting edge flank 121 and functions as a flank for the front cutting edge 110, and a second side surface 134 which is continuous with the front cutting edge flank 111 and constitutes the mounting surface which comes into contact with the mounting seat 220. Note that, in the present embodiment, while the main cutting edge flank 121 and the front cutting edge flank 111 are connected by an R curved surface, the front cutting edge flank 111 and the second side surface 134 are connected by an R curved surface, and the front cutting edge flank 111 is constituted by two flat surfaces, the use of these configurations is optional.

A concave portion which functions as a chip breaker is provided so as to be dug from the upper surface 130. Specifically, the concave portion is constituted by a side rake surface 122, a front rake surface 112, a breaker wall surface 131, and the breaker groove surface 132 which are curved surfaces. The main cutting edge 120 is formed on a ridge of the main cutting edge flank 121 and the side rake surface 122. The front cutting edge 110 is formed on a ridge of the front cutting edge flank 111 and the front rake surface 112.

A first corner 141 is a boundary point between the main cutting edge 120 and the front cutting edge 110. A second corner 142 is one of both ends of the front cutting edge 110 on a side opposite to the side of the first corner 141. A third corner 143 is one of both ends of the main cutting edge 120 on a side opposite to the side of the first corner 141. That is, a ridge from the first corner 141 to the second corner 142 is an effective edge range of the front cutting edge 110, and a ridge from the first corner 141 to the third corner 143 is an effective edge range of the main cutting edge 120. The effective edge range is a range which functions as a cutting blade. The cutting blade may be formed by cutting. The main cutting edge 120 and the front cutting edge 110 are provided to be continuous with each other with the first corner 141 positioned between them, and an extension direction of the main cutting edge 120 and an extension direction of the front cutting edge 110 form an obtuse angle at the first corner 141.

In the present embodiment, the R curved surface is provided between the front cutting edge flank 111 and the main cutting edge flank 121, and hence the first corner 141 is positioned on the ridge of the R curved surface and the concave portion. Herein, the first corner 141 is defined as the middle point on the ridge. In addition, the R curved surface is provided between the front cutting edge flank 111 and the second side surface 134 and, similarly to the first corner 141, the second corner 142 is defined as the middle point on the ridge of the R curved surface and the concave portion. Note that, in the case where the R curved surface is not provided, each corner may be simply defined as a point at which adjacent ridges intersect each other.

The side rake surface 122 and the front rake surface 112 are positioned adjacent to each other, and constitute an inclined surface which descends toward the breaker groove surface 132. The breaker groove surface 132 constitutes a substantially J-shaped groove bottom surface which is continuously extended from a portion positioned adjacent to the side rake surface 122 to a portion positioned adjacent to the front rake surface 112. The breaker wall surface 131 constitutes a wall surface which is continuous with the breaker groove surface 132 and rises up to a boundary with the upper surface 130 and, similarly to the breaker groove surface 132, the breaker wall surface 131 has a substantially J shape.

Chips generated by cutting by the front cutting edge 110 slide on the front rake surface 112, collide with the breaker groove surface 132, and are discharged to the outside along the breaker groove surface 132 as shown in FIGS. 2A and 2B while being broken intermittently by a force of the collision. Similarly, chips generated by cutting by the main cutting edge 120 slide on the side rake surface 122, collide with the breaker groove surface 132, and are discharged to the outside along the breaker groove surface 132 as shown in FIGS. 2A and 2B while being broken intermittently by a force of the collision.

Figure 5:
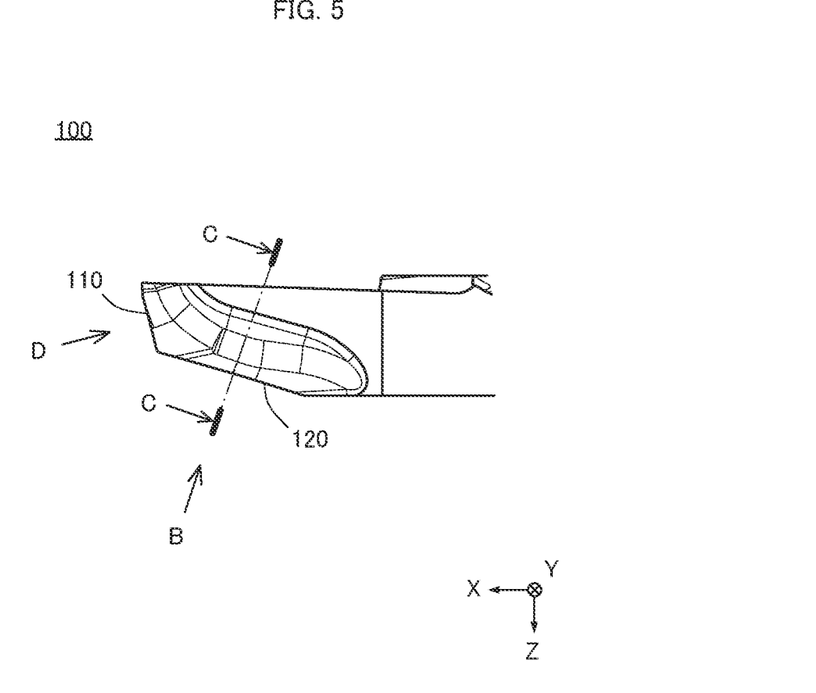
FIG. 5 is part of a top view of the cutting insert.

FIG. 5 is part of a top view of the cutting insert 100. Features of the cutting insert 100 will be described sequentially by using a view seen from a direction of an arrow B which has the main cutting edge 120 at the front, a cross-sectional view taken along the line C-C which is cut with a plane orthogonal to the main cutting edge 120, and a view seen from a direction of an arrow D which has the front cutting edge 110 at the front.

Figure 6:
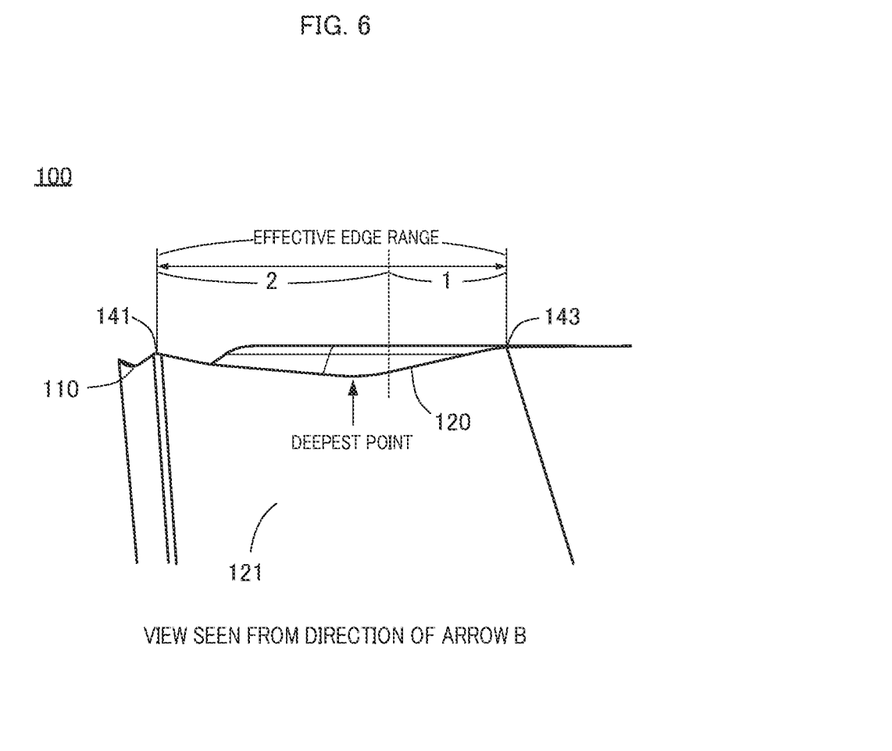
FIG. 6 is a partially enlarged view showing a surrounding area of a main cutting edge.

FIG. 6 is the view seen from the direction of the arrow B in FIG. 5, and is a partially enlarged view showing a surrounding area of the main cutting edge 120. As shown in the drawing, the main cutting edge 120 is curved into a U shape over the entire length of the effective edge range. In addition, the deepest point serving as the bottom of the U shape is positioned in a range closer to the side of the first corner 141 than a position which divides a straight line connecting the first corner 141 and the third corner 143 which are both ends of the main cutting edge 120 at a ratio of 2:1 from the side of the first corner 141. Further, the deepest point is preferably positioned in a range closer to the side of the third corner 143 than a position which divides the straight line connecting the first corner 141 and the third corner 143 at a ratio of 1:1. It is only required that, as a whole, the U-shaped curve is concave downward, and the entire curve may be constituted by a curved line, or the curve may partially include a straight line.

Figure 7:
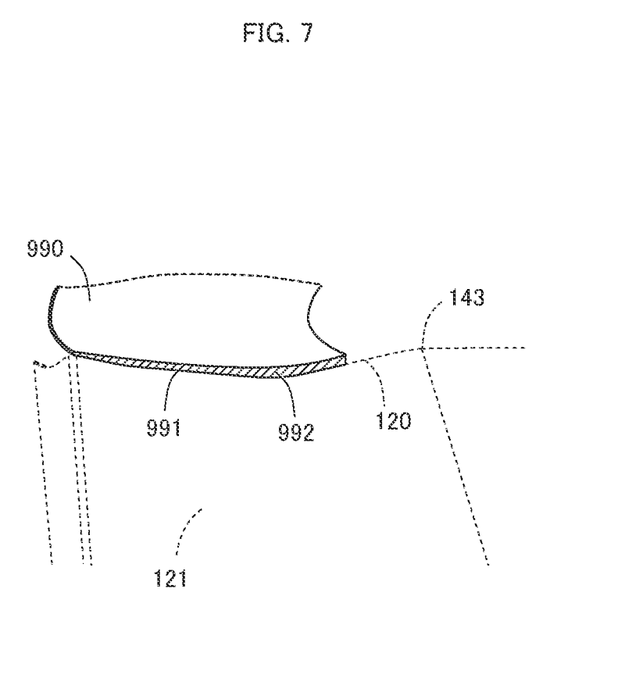
FIG. 7 is a view for explaining chips generated by the main cutting edge.

FIG. 7 is a view for explaining chips 990 generated by the main cutting edge 120. Herein, a case is assumed in which a depth of cut to a workpiece is set to be larger than the deepest point of the U shape of the main cutting edge 120.

With regard to the chips 990 generated by the main cutting edge 120 which is curved into the U shape, in a cross section 991, a portion corresponding to the deepest point of the U shape serves as an inflection portion 992. That is, in the cross section 991, the inflection portion 992 appears at a position close to the third corner 143. Stiffness generated by curving of the cross section 991 acts so as to prevent torsion which occurs in a direction in which the chips 990 move toward the breaker wall surface 131. With this, it becomes easy for a force which the chips 990 receive from the breaker wall surface 131 when the chips 990 collide with the breaker wall surface 131 to act as a force for bending the chips 990 instead of facilitating the torsion of the chips 990. By such a bending force, the generated chips 990 are broken finely. The chips 990 which are broken finely are less likely to roughen a machined surface than lengthened spiral chips.

Figure 8:
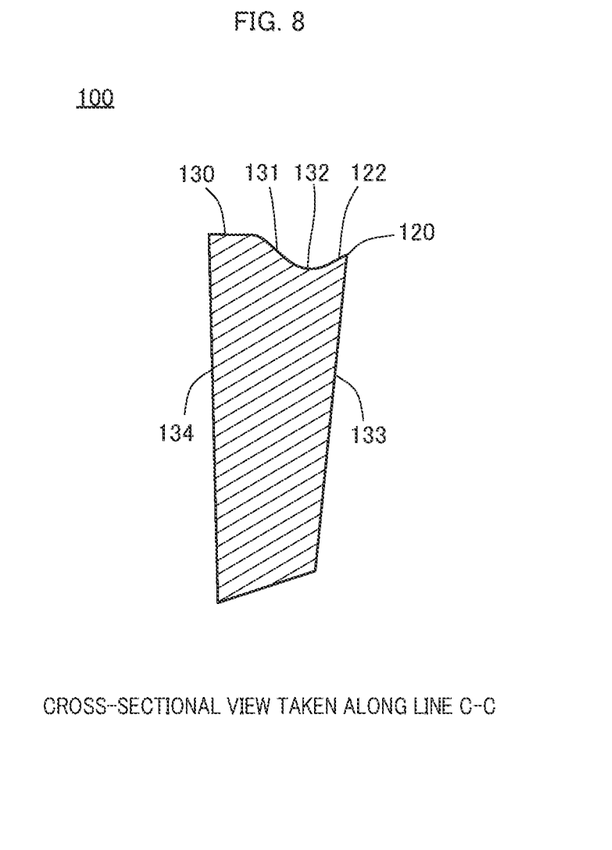
FIG. 8 is a cross-sectional view passing through the main cutting edge.

FIG. 8 is the cross-sectional view taken along the line C-C in FIG. 5. As shown in the drawing, in the concave portion, the side rake surface 122, the breaker groove surface 132, and the breaker wall surface 131 are consecutively connected to the upper surface 130. As described above, the chips 990 having the curved cross section collide with the breaker wall surface 131 and are broken intermittently. Then, the chips 990 are pushed by chips generated from the side of the front cutting edge 110, and are discharged to the outside along the breaker groove surface 132 together with the chips generated from the side of the front cutting edge 110.

Figure 9:
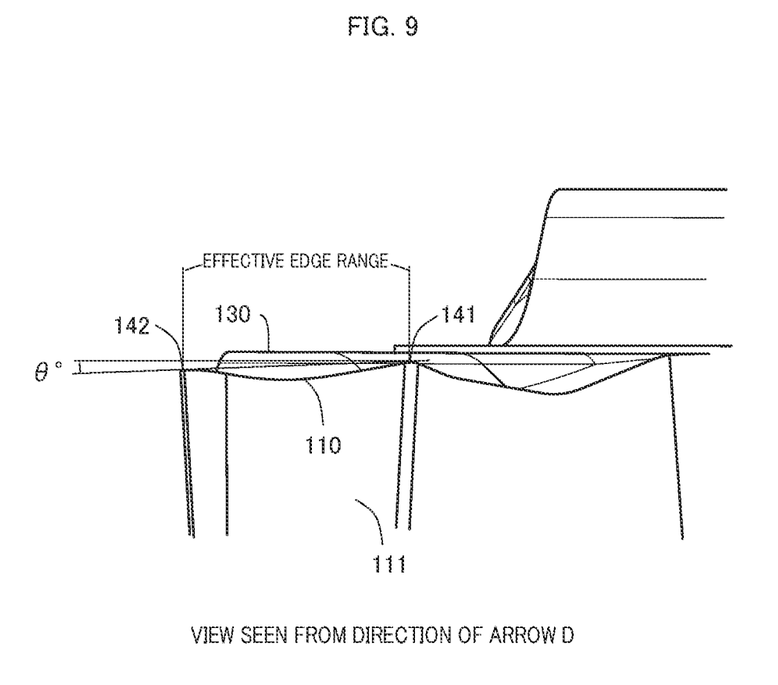
FIG. 9 is a partially enlarged view showing a surrounding area of a front cutting edge.

FIG. 9 is the view seen from the direction of the arrow D in FIG. 5, and is a partially enlarged view showing a surrounding area of the front cutting edge 110. As shown in the drawing, the front cutting edge 110 is also curved into a U shape over the entire length of the effective edge range. The front cutting edge 110 performs cutting of a workpiece by using the entire effective edge range in many cases in machining processes, and hence chips having a curved cross section are almost always generated. The chips having the curved cross section are less likely to cause torsion than chips having a cross section which is not curved, and are broken more easily than the chips having the cross section which is not curved.

In addition, a straight line connecting the first corner 141 and the second corner 142 which are both ends of the front cutting edge 110 has an inclination angle of θ° toward the side of a deep portion of the U shape with respect to a straight line which is parallel to the central axis $z_a$ of the mounting hole 190 and passes through the end on the side of the first corner 141. In other words, the straight line connecting the first corner 141 and the second corner 142 has an intersection angle of θ° with respect to the direction of the rotation axis WA of the workpiece 900 such that the end on the side of the first corner 141 corresponds to an upstream side of rotation of the workpiece 900. θ is not less than 2 and not more than 8, and is preferably not less than 3.5 and not more than 8. When such an inclination angle is provided, it follows that the front cutting edge 110 cuts the workpiece 900 from the side of the first corner 141, and hence chips are discharged in a direction away from the machined surface naturally. That is, it is possible to reduce a possibility that the machined surface is roughened.

While an example of the present embodiment has been described thus far, the present invention is not limited to the above embodiment, and can be variously modified without departing from the object of the invention.

What is claimed is:

1. A cutting insert comprising:
  a rake surface;
  a peripheral side surface;
  a front cutting edge which is provided on a ridge of the rake surface and the peripheral side surface; and
  a main cutting edge which is provided on the ridge so as to be continuous with the front cutting edge, and has an extension direction which forms an obtuse angle with an extension direction of the front cutting edge, wherein
  the main cutting edge has an effective edge range for cutting, and is curved into a U shape over an entire length of the effective edge range of the main cutting edge, and a deepest point of the U shape is positioned in a range closer to a side of a corner than a position which divides a straight line connecting both ends of the main cutting edge at a ratio of 2:1 from the side of the corner positioned adjacent to the front cutting edge, and the front cutting edge has an effective edge range for cutting, and is curved into a U shape over an entire length of the effective edge range of the front cutting edge.

2. A cutting insert comprising:

a rake surface;

a peripheral side surface;

a front cutting edge which is provided on a ridge of the rake surface and the peripheral side surface; and a main cutting edge which is provided on the ridge so as to be continuous with the front cutting edge, and has an extension direction which forms an obtuse angle with an extension direction of the front cutting edge, wherein the main cutting edge has an effective edge range for cutting, and is curved into a U shape over an entire length of the effective edge range of the main cutting edge, and a deepest point of the U shape is positioned in a range closer to a side of a corner than a position which divides a straight line connecting both ends of the main cutting edge at a ratio of 2:1 from the side of the corner positioned adjacent to the front cutting edge, the front cutting edge has an effective edge range for cutting, and is curved into a U shape over an entire length of the effective edge range of the front cutting edge, and a straight line connecting both ends of the front cutting edge has an inclination angle of not less than 2° and not more than 8° toward a side of a deep portion of the U shape of the front cutting edge with respect to a straight line which is parallel to a central axis of a mounting hole for mounting to a cutting tool and passes through the end on the side of the corner.

* * * * *